(12) United States Patent
Watanabe (10) Patent No.: US 10,454,376 B1
(45) Date of Patent: Oct. 22, 2019

(54) POWER SUPPLY CIRCUIT (71) Applicant: ABLIC Inc., Chiba-shi, Chiba (JP)

(72) Inventor: Kotaro Watanabe, Chiba (JP)

(73) Assignee: ABLIC INC., Chiba (JP)

( * ) Notice: Subject to any disclaimer, the term of this patent is extended or adjusted under 35 U.S.C. 154(b) by 0 days.

(21) Appl. No.: 16/363,061

(22) Filed: Mar. 25, 2019

(30) Foreign Application Priority Data

Mar. 30, 2018 (JP) .................................. 2018-069012

(51) Int. Cl.
G05F 1/59 (2006.01)
H02M 3/158 (2006.01)
H02M 3/157 (2006.01)
H02M 1/00 (2006.01)

(52) U.S. Cl.
CPC ......... H02M 3/1584 (2013.01); H02M 3/157 (2013.01); H02M 2001/0003 (2013.01)

(58) Field of Classification Search
CPC . G05F 1/56; G05F 1/562; G05F 1/575; G05F 1/59; G05F 1/62; G05F 1/63; H02M 3/06; H02M 3/07; H02M 3/1584; H02M 2001/0045
See application file for complete search history.

(56) References Cited

U.S. PATENT DOCUMENTS

| 6,903,538 | B2 * | 6/2005 | Umeda | H02M 3/07 323/268 |
| 2004/0027099 | A1 | 2/2004 | Fujii | |
| 2017/0093271 | A1 * | 3/2017 | Lai | H02M 1/088 |
| 2017/0160756 | A1 * | 6/2017 | Hsieh | G05F 1/56 |
| 2018/0129234 | A1 * | 5/2018 | Melgar | H02M 3/158 |
| 2019/0028018 | A1 * | 1/2019 | Datta | H02M 1/08 |

FOREIGN PATENT DOCUMENTS

JP 2002-112457 A 4/2002

* cited by examiner

Primary Examiner — Gary L Laxton
(74) Attorney, Agent, or Firm — Brinks Gilson & Lione (57) ABSTRACT Provided is a power supply circuit including a series regulator step-down power circuit, a charge pump step-up power circuit, and a voltage selection circuit to which a voltage of an input terminal and a voltage of an output terminal are supplied and configured to output a higher voltage from the supplied voltages. A connection point of a first resistor and a second resistor which are connected between the output terminal and a ground terminal is connected to an input of a differential amplifier circuit. An output of the differential amplifier circuit is connected to a gate terminal of an output transistor via a first switch. An output of the voltage selection circuit is connected to the gate terminal of the output transistor via a second switch. The output of the voltage selection circuit is connected to a substrate electrode of the output transistor.

2 Claims, 9 Drawing Sheets

Prior Art

FIG.9

POWER SUPPLY CIRCUIT

RELATED APPLICATIONS

This application claims priority under 35 U.S.C. § 119 to Japanese Patent Application No. 2018-069012 filed on Mar. 30, 2018, the entire content of which are hereby incorporated by reference.

BACKGROUND OF THE INVENTION

1. Field of the Invention

The present invention relates to a power supply circuit configured to supply power to a load by switching a plurality of power circuits.

2. Description of the Related Art

Figure 9:
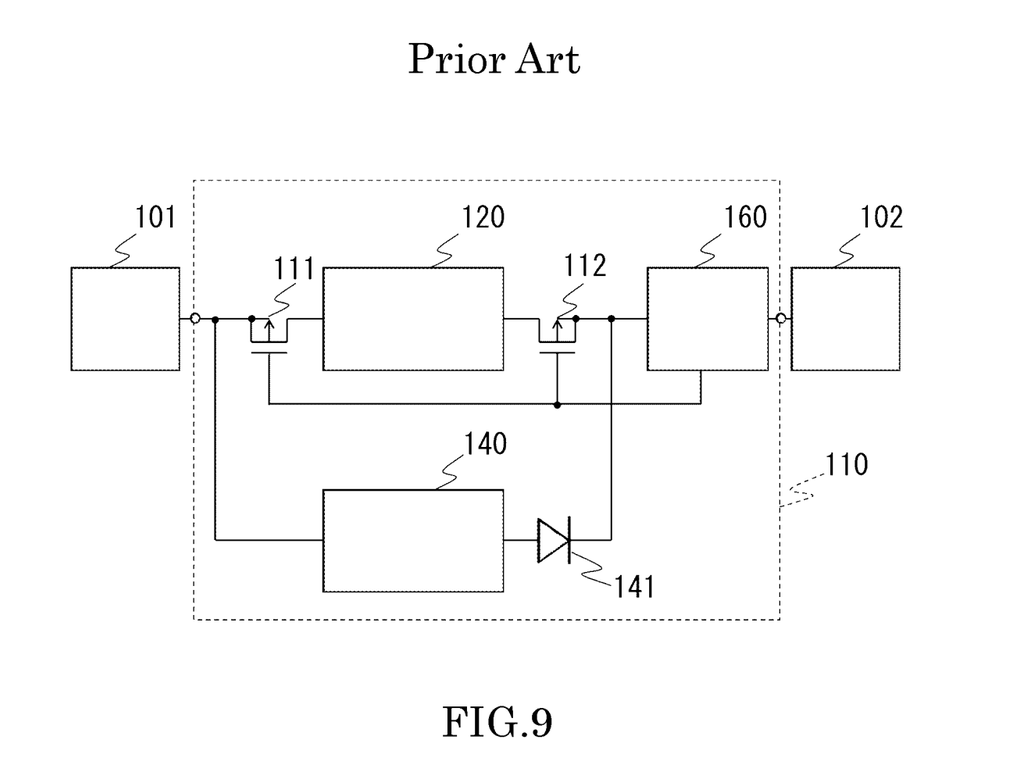
FIG. 9 is a diagram for illustrating a power supply circuit in prior art.

A configuration disclosed in Japanese Patent Application Laid-open No. 2002-112457 is known as a power supply circuit in prior art. A power supply circuit disclosed in Japanese Patent Application Laid-open No. 2002-112457 is illustrated in FIG. "9.

The power supply circuit 110 which is disclosed in Japanese Patent Application Laid-open No. 2002-112457 includes a power circuit 120, a power circuit 140, a switch 111, a switch 112, and operation mode detecting means 160, and is connected in series between a battery 101 and a load 102.

Electric current flowing in the load is detected by the operation mode detecting means 160 and, when the load current is large, the switch 111 and the switch 112 are turned on in order to enable the power circuit 120. This causes power supply from the power circuit 120 and the power circuit 140 both. When the load current is small, the switch 111 and the switch 112 are turned off in order to disable the power circuit 120 and enable the power circuit 140. This causes power supply from the power circuit 140 alone.

The operation described above allows selection of an optimum power circuit for the load, and accordingly improves efficiency.

The power circuit 120 is constituted by a switching regulator, and the power circuit 140 is constituted by a series regulator. A backflow prevention diode 141 which prevents backward flow of the electric current from the output of the power circuit 120 is attached to the output portion of the power circuit 140.

In the conventional power supply circuit, the switches for switching the power circuits and the backflow prevention diode are inserted in series between the battery and the load, and a voltage which is generated in each of the power circuits and is lowered due to the on-resistances of the switches or due to a forward voltage drop of the diode is supplied to the load as a result.

SUMMARY OF THE INVENTION

According to one embodiment of the present invention, there is provided a power supply circuit, including: an input terminal; an output terminal; a ground terminal; a series regulator step-down power circuit which has an input connected to the input terminal and an output connected to the output terminal and which includes a P-channel MOSFET serving as an output transistor a differential amplifier circuit, a first resistor, a second resistor, a first switch, and a second switch; a charge pump step-up power circuit which has an input connected to the input terminal and an output connected to the output terminal; and a voltage selection circuit to which a voltage of the input terminal and a voltage of the output terminal are supplied and configured to output a higher voltage of the voltage of the input terminal and the voltage of the output terminal. The first resistor and the second resistor are connected in series between the output terminal and the ground terminal, a connection point at which the first resistor and the second resistor are connected is connected to an input of the differential amplifier circuit, an output of the differential amplifier circuit is connected to a gate terminal of the output transistor via the first switch, an output of the voltage selection circuit is connected to the gate terminal of the output transistor via the second switch, and the output of the voltage selection circuit is connected to a substrate electrode of the output transistor.

According to another embodiment of the present invention, there is provided a power supply circuit, including: an input terminal; an output terminal; a ground terminal; a series regulator step-down power circuit which has an input connected to the input terminal and an output connected to the output terminal and which includes an N-channel MOSFET serving as an output transistor, a differential amplifier circuit, a first resistor, a second resistor, a first switch, and a second switch; and a charge pump step-up power circuit which has an input connected to the input terminal and an output connected to the output terminal. The first resistor and the second resistor are connected in series between the output terminal and the ground terminal, a connection point at which the first resistor and the second resistor are connected is connected to an input of the differential amplifier circuit, an output of the differential amplifier circuit is connected to a gate terminal of the output transistor via the first switch, the ground terminal is connected to the gate terminal of the output transistor via the second switch, and the ground terminal is connected to a substrate electrode of the output transistor.

According to the present invention, a power supply circuit is realized without a switch and a diode connected in series between a battery and a load respectively in order to switch voltages, thereby eliminating the voltage drop caused by the switch and the diode.

DETAILED DESCRIPTION OF THE PREFERRED EMBODIMENTS

Now, embodiments of the present invention are described with reference to the drawings.

First Embodiment

Figure 1:
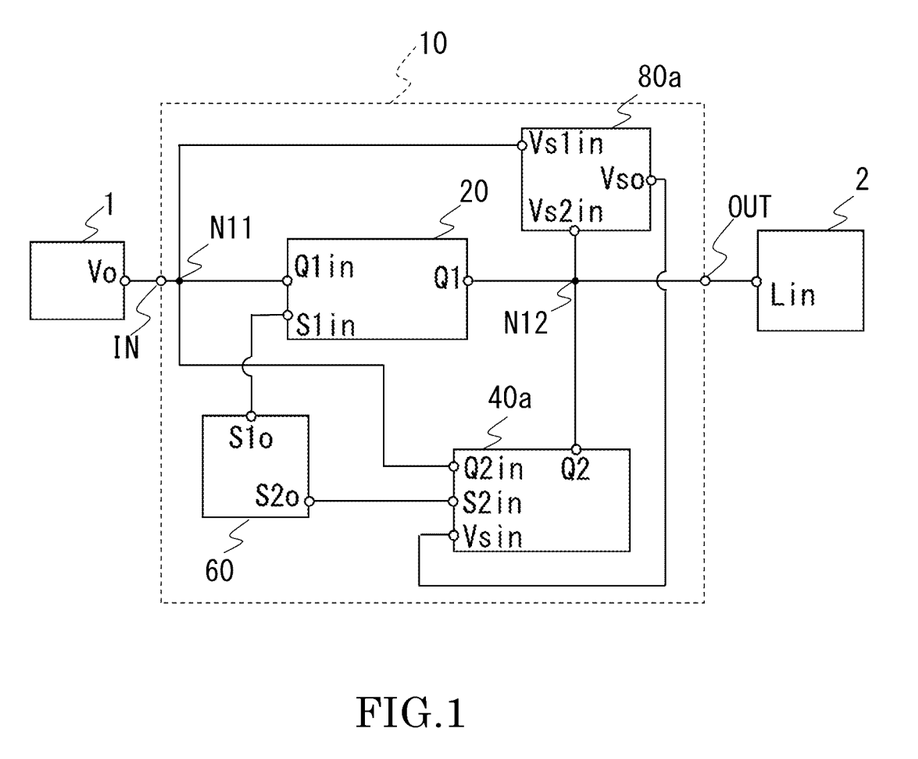
FIG. 1 is a diagram for illustrating a power supply circuit according to a first embodiment of the present invention.

FIG. 1 is a diagram for illustrating a power supply circuit 10 according to the first embodiment of the present invention. The power supply circuit 10 includes the first power circuit 20, the second power circuit 40a, a mode selection circuit 60, a voltage selection circuit 80a, an input terminal IN, and an output terminal OUT. The power supply circuit 10 is connected in series between a battery 1 and a load 2, the battery 1 supplies a voltage Vin from a terminal Vo to the input terminal IN, and the load 2 receives a supply of power at a terminal Lin from the output terminal OUT. The input terminal IN is connected, via a node N11, to a terminal Q1in of the first power circuit 20, a terminal Q2in of the second power circuit 40a, and a terminal Vs1in of the voltage selection circuit 80a. The mode selection circuit 60 has a terminal S1o connected to a terminal S1in of the first power circuit 20, and a terminal S2o connected to a terminal S2in of the second power circuit 40a. The voltage selection circuit 80a has a terminal Vso connected to a terminal Vsin of the second power circuit 40a. The first power circuit 20 has a terminal Q1 connected, via a node N12, to a terminal Vs2in of the voltage selection circuit 80a, a terminal Q2 of the second power circuit 40a, and the output terminal OUT.

Figure 2:
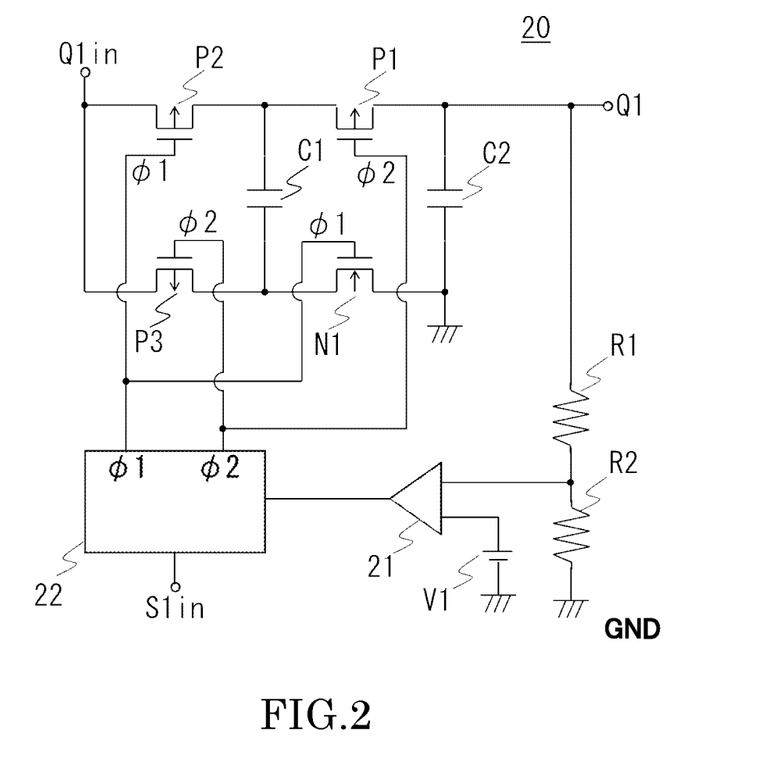
FIG. 2 is a diagram for illustrating a first power circuit of the first embodiment.

FIG. 2 is a diagram for illustrating the first power circuit 20 of the first embodiment. The first power circuit 20 includes PMOS transistors P1, P2, and P3 and an NMOS transistor N1 which are switching elements, resistors R1 and R2, capacitors C1 and C2, a reference voltage circuit V1, a differential amplifier circuit 21, a control circuit 22, and the terminals Q1in, Q1, and S1in.

The terminal Q1in is connected to a source terminal of the PMOS transistor P2 and a source terminal of the PMOS transistor P3. The PMOS transistor 2 has a gate terminal connected to a signal Φ1 of the control circuit 22, and a drain terminal connected to one terminal of the capacitor C1 and a source terminal of the PMOS transistor P1. The PMOS transistor P1 has a gate terminal connected to a signal Φ2 of the control circuit 22, and a drain terminal connected to one terminal of the capacitor C2, one terminal of the resistor R1, and the terminal Q1. The PMOS transistor P3 has a gate terminal connected to the signal Φ2 of the control circuit 22, and a drain terminal connected to the other terminal of the capacitor C2 and a drain terminal of the NMOS transistor N1. The NMOS transistor N1 has a gate terminal connected to the signal Φ1 of the control circuit 22, and a source terminal connected to the other terminal of the capacitor C2 and to the ground terminal GND. The other terminal of the resistor R1 is connected to one input of the differential amplifier circuit 21 and one terminal of the resistor R2. The other terminal of the resistor R2 is connected to the ground terminal. The differential amplifier circuit 21 has the other input connected to the reference voltage circuit V1, and an output connected to the control circuit 22. The control circuit 22 receives a signal from the terminal S1in and provides the signal Φ1 to the transistors P2 and N1, and the signal Φ2 to the transistors P1 and P2.

Figure 3:
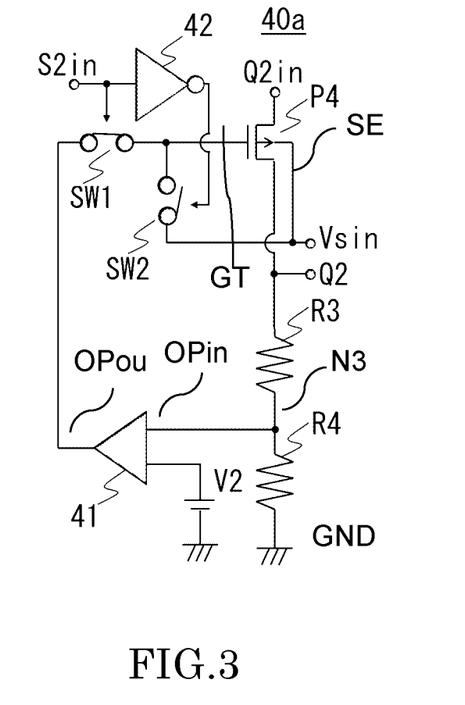
FIG. 3 is a diagram for illustrating a second power circuit of the first embodiment.

FIG. 3 is a diagram for illustrating the second power circuit 40a of the first embodiment. The second power circuit 40a includes switches SW1 and SW2, a PMOS transistor P4 which is an output transistor, resistors R3 and R4, a reference voltage circuit V2, a differential amplifier circuit 41, an inverter 42, and the terminals S2in, Q2in, Vsin, and Q2.

The terminal Q2in is connected to a source terminal of the PMOS transistor P4. The terminal Vsin is connected to a substrate electrode SE of the PMOS transistor P4 and one of I/O terminals of the switch SW2. The terminal S2in is connected to an input of the inverter 42 and a control terminal of the switch SW1. An output of the inverter 42 is connected to a control terminal of the switch SW2. The PMOS transistor P4 has a drain terminal connected to the terminal Q2 and one terminal of the resistor R3, and a gate terminal GT connected to one of I/O terminals of the switch SW1, and the other one of I/O terminals of the switch SW2. The other terminal of the resistor R3 is connected to one input OPin of the differential amplifier circuit 41 and one terminal of the resistor R4 at the connection point N34. The other terminal of the resistor R4 is connected to the ground terminal GND. The differential amplifier circuit 41 has the other input connected to the reference voltage circuit V2, and an output OPout connected to the other one of I/O terminals of the switch SW1.

Figure 4:
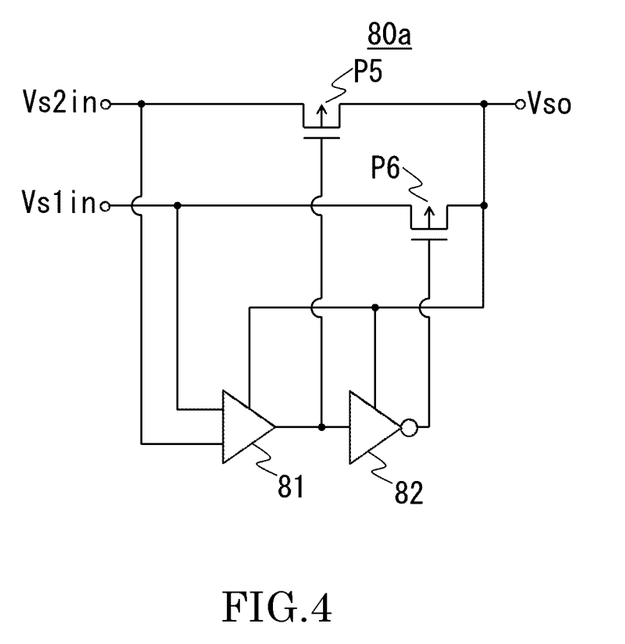
FIG. 4 is a diagram for illustrating a voltage selection circuit of the first embodiment.

FIG. 4 is a diagram for illustrating the voltage selection circuit 80a of the first embodiment. The voltage selection circuit 80a includes PMOS transistors P5 and P6, a differential amplifier circuit 81, an inverter 82, and the terminals Vs1in, Vs2in, and Vso.

The terminal Vs1in is connected to one input of the differential amplifier circuit 81 and a source terminal of the PMOS transistor P6. The terminal Vs2in is connected to the other input of the differential amplifier circuit 81 and a source terminal of the PMOS transistor P5. A drain terminal of the PMOS transistor P5 is connected to a drain terminal of the PMOS transistor P6, the terminal Vso, a power supply terminal of the differential amplifier circuit 81, and a power supply terminal of the inverter 82. An output of the differential amplifier circuit 81 is connected to a gate terminal of the PMOS transistor P5 and an input of the inverter 82. An output of the inverter 82 is connected to a gate terminal of the PMOS transistor P6.

The operation of the power supply circuit 10 configured as above according to the first embodiment is described.

In the power supply circuit 10 according to the first embodiment, the first power circuit 20 is a double-boost charge pump circuit, and the second power circuit 40a is a series regulator. The mode selection circuit 60 provides a signal S1 for selection of the first power circuit 20 from the terminal S1o and provides a signal S2 for selection of the second power circuit 40a from the terminal S2o. Receiving the signal S1 at the terminal S1in, the first power circuit 20 steps up the voltage Vin supplied from the terminal Q1in to a twice higher voltage and provides a voltage Vu obtained by the stepping up from the terminal Q1. Receiving the signal S2 at the terminal S2in, the second voltage circuit 40a steps down the voltage Vin supplied from the terminal Q2in and provides a voltage Vd obtained by the stepping down from the terminal Q2. The voltage Vu provided from the first power circuit 20 and the voltage Vd provided from the second power circuit 40a have a relation Vu>Vd. The voltage selection circuit 80a uses the differential amplifier circuit 81 to compare a voltage supplied to the terminal Vs1in with a voltage supplied to the terminal Vs2in, turns on the PMOS transistor connected to the terminal to which higher voltage is supplied, and provides the higher voltage from the terminal Vso.

[Operation Under Selection of the First Power Circuit]

Under selection of the first power circuit, the mode selection circuit 60 provides the signal S1 for selection of the first power circuit 20 and stops output of the signal S2 for selection of the second power circuit 40*a*. In the first power circuit 20, the control circuit 22 starts operating upon input of the signal S1 for selection of the first power circuit, and controls the PMOS transistors P1, P2, and P3 and the NMOS transistor N1 so that a predetermined output voltage is obtained, thereby generating the output voltage Vu which is determined by the voltages of the resistors R1 and R2 and the reference voltage circuit V1 at the terminal Q1 of the first power circuit 20. The voltage selection circuit 80*a* compares the output voltage Vu supplied to the terminal Vs2in from the first power circuit 20 with the voltage Vin supplied to the terminal Vs1in from the battery 1, and provides the higher voltage as the voltage Vu from the terminal Vso of the voltage selection circuit 80*a*.

Meanwhile, electrical connection is not made in the switch SW1 and is made in the switch SW2 in the second power circuit 40*a* illustrated in FIG. "3 because the signal S2 for selection of the second power circuit 40*a* is not supplied. With no electrical connection in the switch SW1, the second power circuit 40*a* does not operate as a series regulator. The PMOS transistor P4 is completely turned off because the voltage Vu supplied from the voltage selection circuit 80*a* to the terminal Vsin is supplied to the gate terminal GT via the substrate electrode SE and the switch SW2. In the PMOS transistor P4, the substrate electrode SE is pulled out independently. This allows complete shut off of the second power circuit 40*a* even when the output voltage Vu of the first power circuit 20 (a voltage at the drain terminal of the transistor P4) is higher than the voltage Vin of the battery 1 (a voltage at the source terminal of the PMOS transistor P4), and hence a backflow prevention diode is not required between the terminal Q1 and the terminal Q2.

[Operation Under Selection of the Second Power Circuit]

Under selection of the second power circuit, the mode selection circuit 60 stops output of the signal S1 for selection of the first power circuit 20 and provides the signal S2 for selection of the second power circuit 40*a*. Since the signal S1 to the first power circuit 20 is not supplied, the control circuit 22 stops the operation, the PMOS transistors P1, P2, and P3 and the NMOS transistor N1 are all turned off, and voltage output to the terminal Q1 is ceased. The voltage selection circuit 80*a* compares a voltage supplied to the terminal Vs2in with the voltage Vin supplied to the terminal Vs1in from the battery 1, but because the voltage Vu is not supplied from the first power circuit, the voltage selection circuit 80*a* provides the voltage Vin supplied to the terminal Vs1in from the terminal Vso.

In the second power circuit 40*a*, the input of the signal S2 used to select the second power circuit makes electrical connection in the switch SW1 and breaks electrical connection in the switch SW2. With electrical connection made in the switch SW1, the second power circuit 40*a* starts operation as a series regulator.

In the PMOS transistor P4, the voltage Vin supplied to the terminal Vsin from the voltage selection circuit 80*a* is supplied to the substrate electrode SE, thereby making the electric potential of the substrate electrode SE equal to the electric potential of the source terminal. The PMOS transistor P4 starts operation as an output transistor of the series regulator so that the voltage Vd output to the terminal Q2 of the second power circuit 40*a* equals an output voltage set by the voltages of the resistors R3 and R4 and the reference voltage circuit V2.

The first power circuit 20 has a potential difference between the terminal Q1in, which is the voltage Vin of the battery 1, and the terminal Q1, which is the output voltage of the second power circuit. However, the PMOS transistors P2 and P1 of the first power circuit 20 are completely turned off and, consequently, no current flows between the terminal Q2 of the second power circuit 40*a* and the terminal Vo of the battery 1 via the terminal Q1in and terminal Q1 of the first power circuit 20.

This configuration eliminates the need to place elements for switching power circuits between the first power circuit 20 and the load 2 and between the second power circuit 40*a* and the load 2, permitting supply of the voltage to the load without voltage drop. Another effect of eliminating the need for elements for switching power circuits is a reduction of the chip area.

Although not shown, current consumption may be reduced by adding a switch between the resistor R2 and the ground terminal in the first power circuit 20 to cut off the current path, or by stopping the differential amplifier circuit 21 while the first power circuit is not in operation. Current consumption may be reduced as well by adding a switch between the resistor R4 and the ground terminal GND in the second power circuit 40*a* to cut off the current path, or by stopping the differential amplifier circuit 41 while the second power circuit is not in operation.

Second Embodiment

Figure 5:
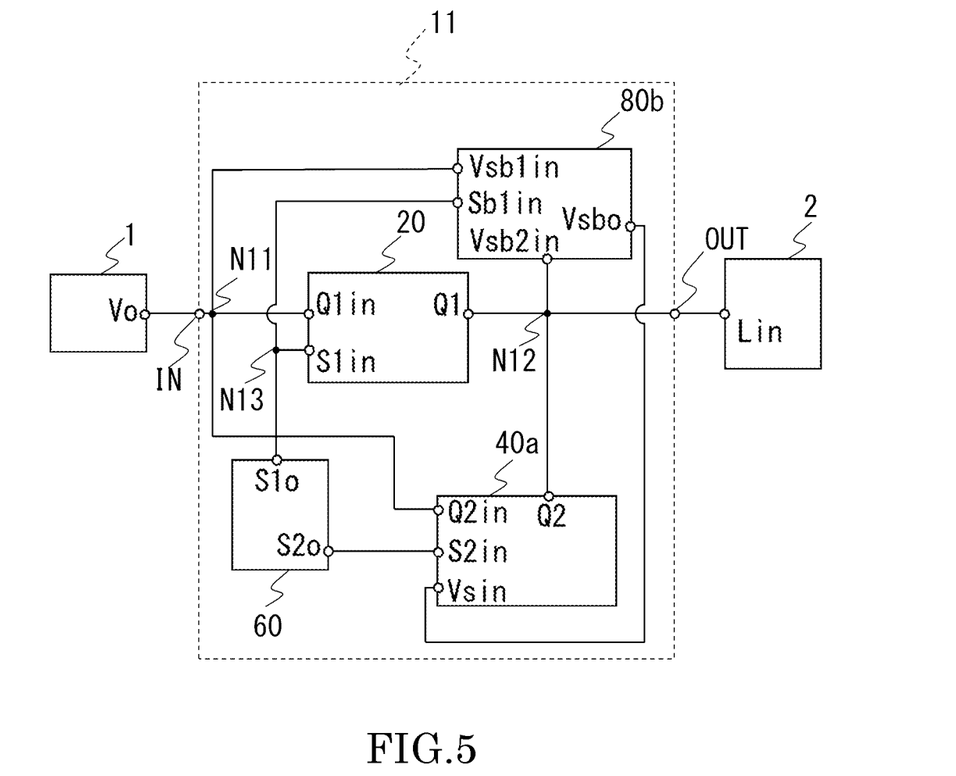
FIG. 5 is a diagram for illustrating a power supply circuit according to a second embodiment of the present invention.

FIG. 5 is a diagram for illustrating a power supply circuit 11 according to the second embodiment of the present invention in which a voltage selection circuit 80*b* replaces the voltage selection circuit 80*a* of the power supply circuit 10 according to the first embodiment. The voltage selection circuit 80*b* has a terminal Vsb1in is connected to the input terminal IN via the node N11, a terminal Vsb2in connected, via the node N12, to the terminal Q1 of the first power circuit, the terminal Q2 of the second power circuit, and the output terminal OUT, a terminal Sb1in connected to the terminal S1*o* of the mode selection circuit 60 via a node N13, and a terminal Vsbo connected to the terminal Vsin of the second power circuit 40*a*. The rest of the connection is the same as in the power supply circuit 10 according to the first embodiment.

Figure 6:
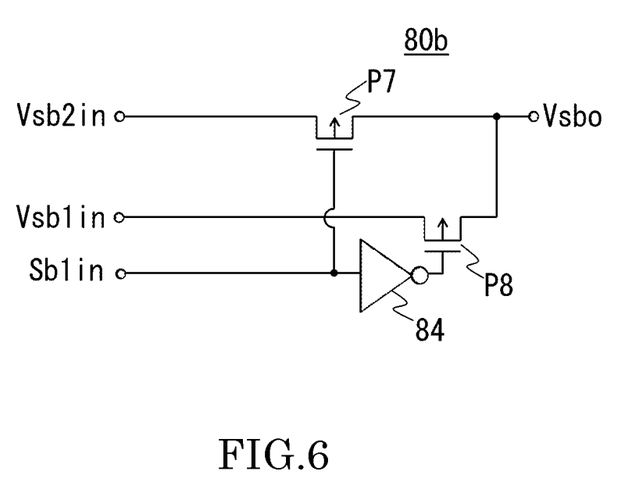
FIG. 6 is a diagram for illustrating a voltage selection circuit of the second embodiment.

FIG. 6 is a diagram for illustrating the voltage selection circuit 80*b* of the second embodiment. The voltage selection circuit 80*b* includes PMOS transistors P7 and P8, an inverter 84, and the terminals Vsb1in, Vsb2in, Sb1in, and Vsbo.

The terminal Vsb1in is connected to a source terminal of the PMOS transistor P8. The terminal Vsb2in is connected to a source terminal of the PMOS transistor P7. The terminal Sb1in is connected to a gate terminal of the PMOS transistor P7 and an input of the inverter 84. An output of the inverter 84 is connected to a gate terminal of the PMOS transistor P8. A drain terminal of the PMOS transistor P7 is connected to a drain terminal of the PMOS transistor P8 and the terminal Vsbo.

The operation of the power supply circuit 11 configured as above according to the second embodiment is described.

The voltage selection circuit 80*b* provides, from the terminal Vso, based on a signal input to the terminal Sb1in, one of a voltage supplied to the terminal Vsb1 in and a voltage supplied to the terminal Vsb2in.

[Operation Under Selection of the First Power Circuit]

The operation of the power supply circuit 11 according to the second embodiment is basically the same as the operation of the power supply circuit 10 according to the first embodiment. Only the operation different from that of the power supply circuit 10 according to the first embodiment is therefore described here.

Under selection of the first power circuit, the mode selection circuit 60 provides the signal S1 for selection of the first power circuit 20 and stops output of the signal S2 for selection of the second power circuit 40a. In the voltage selection circuit 80b, the PMOS transistor P7 is turned on and the PMOS transistor P8 is turned off to provide the output voltage Vu of the first power circuit from the terminal Vsbo of the voltage selection circuit 80b. Subsequent operation is the same as in the first embodiment.

[Operation Under Selection of the Second Power Circuit]

Under selection of the second power circuit, the mode selection circuit 60 stops output of the signal S1 for selection of the first power circuit 20 and provides the signal S2 for selection of the second power circuit 40a. In the voltage selection circuit 80b, the PMOS transistor P7 is turned off and the PMOS transistor P8 is turned on to output the voltage Vin from the terminal Vsbo of the voltage selection circuit 80b. Subsequent operation is the same as in the first embodiment.

The present configuration is effective when the timing at which the first power circuit is put into operation and the timing at which the second power circuit is put into operation are determined in advance, and the absence of the differential amplification circuit 81 makes the current consumption lower and the chip area even smaller than in the power supply circuit 10 according to the first embodiment.

Third Embodiment

Figure 7:
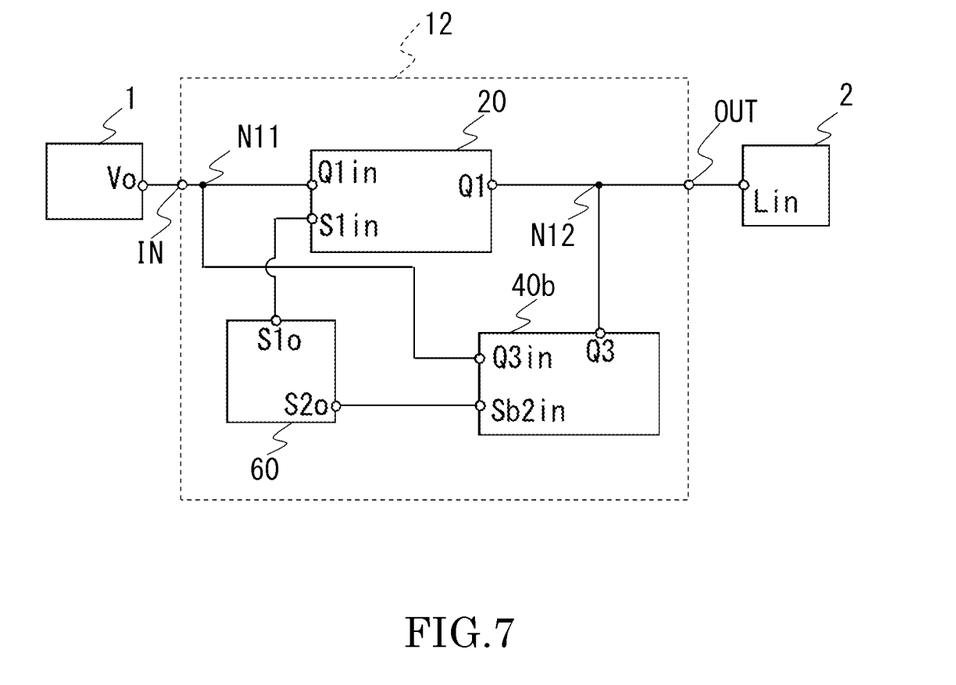
FIG. 7 is a diagram for illustrating a power supply circuit according to a third embodiment of the present invention.

FIG. 7 is a diagram for illustrating a power supply circuit 12 according to the third embodiment of the present invention in which a third power circuit 40b replaces the second power circuit 40a of the first embodiment, and the voltage selection circuit 80a is eliminated.

Figure 8:
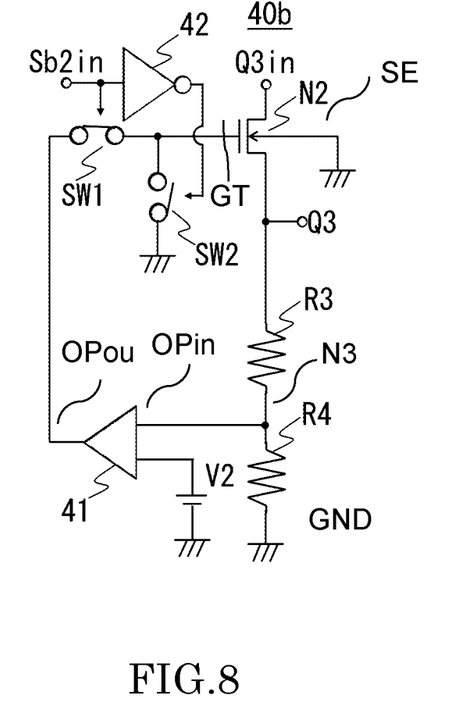
FIG. 8 is a diagram for illustrating a third power circuit of the third embodiment.

FIG. 8 is a diagram for illustrating the third power circuit 40b. The third power circuit 40b is obtained by replacing the PMOS transistor P4 of the second power circuit 40a with an NMOS transistor N2.

A terminal Q3in is connected to a drain terminal of the NMOS transistor N2. The terminal Sb2in is connected to an input of the inverter 42 and a control terminal of the switch SW1. An output of the inverter 42 is connected to a control terminal of the switch SW2. The NMOS transistor N2 has a source terminal connected to a terminal Q3 and one terminal of the resistor R3, and a gate terminal GT connected to one of I/O terminals of the switch SW1, and one of I/O terminals of the switch SW2. The other one of I/O terminals of the switch SW2 is connected to the ground terminal GND. The other terminal of the resistor R3 is connected to one input OPin of the differential amplifier circuit 41 and one terminal of the resistor R4 at the connection point N34. The other terminal of the resistor R4 is connected to the ground terminal GND. The differential amplifier circuit 41 has the other input connected to the reference voltage circuit V2, and an output OPout connected to the other one of I/O terminals of the switch SW1.

The operation of the power supply circuit 12 configured as above according to the third embodiment is described.

The operation of the power supply circuit 12 according to the third embodiment is basically the same as the operation of the power supply circuit 10 according to the first embodiment. Only the operation different from that of the power supply circuit 10 according to the first embodiment is therefore described here.

The third power circuit 40b of the power supply circuit 12 according to the third embodiment uses the NMOS transistor N2 as an output transistor. In the NMOS transistor N2 the substrate electrode SE has the voltage of the ground terminal GND, and the voltage of the gate terminal GT, too, is set to the voltage of the ground terminal GND when the switch SW2 is turned on. This allows the NMOS transistor N2 to be completely turned off when the third power circuit 40b is not in operation.

In the NMOS transistor N2, the substrate electrode SE is pulled out independently. This allows complete shut off of the third power circuit 40b even when the output voltage Vu of the first power circuit 20 (a voltage at the source terminal of the NMOS transistor N2) is higher than the voltage Vin of the battery 1 (a voltage at the drain terminal of the NMOS transistor N2), and hence a backflow prevention diode is not required between the terminal Q1 and the terminal Q3.

Since the voltage selection circuit 80a is not required in the configuration shown above, the lowering of current consumption and a further reduction of the chip area are achieved.

Although not shown, current consumption may be reduced by adding a switch between the resistor R4 and the ground terminal GT in the third power circuit 40b to cut off the current path, or by stopping the differential amplifier circuit 41 while the third power circuit is not in operation. While a case in which two power circuits are included is taken as an example here, three or more power circuits may be used according to the present invention. The configurations of the power supply circuits according to the first embodiment to the third embodiment are given as an example and can be modified without departing from the scope of claims.

What is claimed is:

1. A power supply circuit, comprising:
   an input terminal;
   an output terminal;
   a ground terminal;
   a series regulator step-down power circuit having an input connected to the input terminal and an output connected to the output terminal and including a P-channel MOSFET serving as an output transistor, a differential amplifier circuit, a first resistor, a second resistor, a first switch, and a second switch;
   a charge pump step-up power circuit having an input connected to the input terminal and an output connected to the output terminal; and
   a voltage selection circuit to which a voltage of the input terminal and a voltage of the output terminal are supplied and configured to output a higher voltage of the voltage of the input terminal and the voltage of the output terminal,
   the first resistor and the second resistor being connected in series between the output terminal and the ground terminal;
   a connection point of the first resistor and the second resistor being connected to an input of the differential amplifier circuit;
   an output of the differential amplifier circuit being connected to a gate terminal of the output transistor via the first switch;

an output of the voltage selection circuit being connected to the gate terminal of the output transistor via the second switch; and the output of the voltage selection circuit being connected to a substrate electrode of the output transistor.

2. A power supply circuit, comprising:

an input terminal;

an output terminal;

a ground terminal;

a series regulator step-down power circuit having an input connected to the input terminal and an output connected to the output terminal and including an N-channel MOSFET serving as an output transistor, a differential amplifier circuit, a first resistor, a second resistor, a first switch, and a second switch; and a charge pump step-up power circuit having an input connected to the input terminal and an output connected to the output terminal, the first resistor and the second resistor being connected in series between the output terminal and the ground terminal;

a connection point of the first resistor and the second resistor being connected to an input of the differential amplifier circuit;

an output of the differential amplifier circuit being connected to a gate terminal of the output transistor via the first switch;

the ground terminal being connected to the gate terminal of the output transistor via the second switch; and the ground terminal being connected to a substrate electrode terminal of the output transistor.

* * * * *